United States Patent Office 3,714,129
Patented Jan. 30, 1973

3,714,129
POLYMERS WITH RECURRING IMIDAZOLE SEGMENTS
Billy M. Culbertson, Burnsville, Minn., assignor to Ashland Oil & Refining Company, Ashland, Ky.
No Drawing. Continuation of abandoned application Ser. No. 606,035, Dec. 30, 1966. This application Apr. 26, 1971, Ser. No. 137,652
Int. Cl. C08g 20/32
U.S. Cl. 260—78 TF                       1 Claim

ABSTRACT OF THE DISCLOSURE

A polymeric composition in which the recurring units along the polymer chain have the formula:

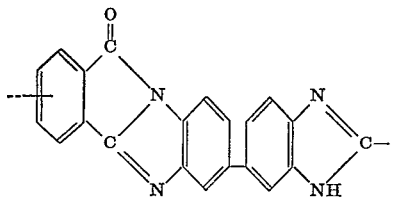

is characterized by a very high degree of thermal stability.

CROSS-REFERENCE TO RELATED APPLICATION

This application is a continuation of my copending application Ser. No. 606,035 which was filed on Dec. 30, 1966 and is now abandoned.

The polymers are useful in the formation of thermally stable fibers and films.

This invention relates to novel polymers having imidazole segments along the polymer chain and to processes for preparing those polymers.

It is known that polymers with aromatic structures along the polymer clain have a higher degree of thermal stability than similar polymers which consist of non-aromatic units. It has now been found that a highly desirable polymer may be prepared having aromatic imidazole segments along the polymer chain and that such a polymer may be readily prepared from available materials. The resulting polymer has an exceedingly high degree of thermal stability in that it loses less than 10 percent of its weight when subjected to temperatures of 500° C. and higher. The polymeric products are, therefore, admirably suited for use in the preparation of molded articles which will be subjected to elevated temperatures in their normal use.

It is an object of this invention to provide a novel polymer having imidazole segments along the polymer chain. It is another object of this invention to provide a novel polymer having a high degree of thermal stability. It is another object of this invention to provide a process for preparing novel polymers of this invention.

Still other objects will be apparent from the more detailed description of this invention which follows.

This invention provides a novel polymer in which the polymer chain comprises recurring units of the formula:

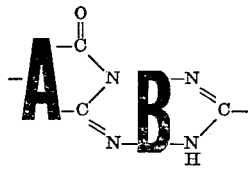

wherein A and B are aromatic or heteroaromatic cyclic structures. In the most preferred combination of this invention, A is the residue of benzene and B is a residue of biphenyl, thus, producing a polymer which may be described as having alternating segments of benzimidazole and 1,2-benzoylbenzimidazole.

The polymers of this invention are prepared by reacting at a temperature of about 150°–350° C. an aromatic tetraamine or a heteroaromatic tetraamine with an aromatic or heteroaromatic tricarboxylic acid or its anhydride or an ester of an aromatic or heteroaromatic tricarboxylic acid anhydride, e.g., preferably phenyl trimellitate anhydride. In general, the process involves reacting substantially equimolar amounts of the two reactants at the reaction temperature for a time of at least about 1 hour or more in a reduced atmosphere which aids in removing water or other condensation by-products from the desired product. The process may proceed in a single stage reaction or in a two-step reaction, the latter involving a preparation of the intermediate monoamide in one stage which is then polymerized to the final product in the second stage. As will be described hereinbelow, certain process modifications are desired when employing certain combinations of reactants.

The polymeric products of this invention are thermoplastic materials which range from high molecular weight to low molecular weight materials and are useful in the preparation of films, fibers, shaped articles, molded objects, and the like. Because of its high degree of thermal stability, this polymer is particularly useful in the manufacture of articles which will be subjected to elevated temperatures during their period of use. Polymers of this invention which have lower molecular weights are useful in the preparation of coating or adhesive compositions.

The polymeric product of this invention has a polymer chain of recurring aromatic residues. There are no non-aromatic segments in the polymer chain although they may be present in side chains. The aromatic segments may be carbocyclic or heterocyclic so long as they are aromatic in character. The more common heteroatoms which are employed in this invention are oxygen, nitrogen, and sulfur. The aromatic character of the polymeric residues is determined by the presence of an electronic structure which has certain similarities to benzene or other well recognized aromatic compounds. The generally accepted theories of chemistry today relate aromatic character to the presence of pi electrons, which in turn produce a resonance in the cyclic structure that resembles to some extent the resonance found in benzene. Thus, many heterocyclic structures are considered to be aromatic even through they do not have the completely conjugated, unsaturated structure of benzene. In the description of this invention, it is considered that a heterocyclic structure which has at least one unsaturated linkage in the cyclic nucleus is aromatic.

There are certain heterocyclic structures which form a part of a fused ring system, in which case the entire system is considered aromatic if any one of the individual cycles in the system is aromatic. Thus, a compound such as phthalimide is considered to be heteroaromatic even though the imide heterocycle itself does not contain an unsaturated linkage.

The polymers of this invention are prepared by reacting a tetraamine with a tricarboxylic acid, a tricarboxylic acid anhydride, or an ester of a tricarboxylic acid anhydride wherein the tricarboxylic acid nucleus is aromatic or heteroaromatic. These three types of materials are referred to collectively herein as "a tricarboxylic acid substance." In the tricarboxylic acid all three acid groups are present as free acid groups. In the anhydride two of the acid groups form the anhydride ring while the third is a free acid group. In the ester, the free acid group of the anhydride is esterified, preferably with phenol. The other reactant is a tetraamine having an aromatic or heteroaromatic nucleus upon which the four amine groups are arranged in two pairs of ortho-position amines. It is preferable, although not absolutely necessary, that each pair of amine groups be separated from the other pair by at least one cyclic nucleus atom of the aromatic or heteroaromatic cycle, thus, making each amine group in any pair no closer than the meta-position to any amine group in the other pair.

There are three distinguishable, although similar, processes for accomplishing the polymerization of this invention. In the first procedure, which is the preferred procedure, the ester anhydride, preferably a phenyl ester anhydride, and the tetraamine are reacted in stoichiometric proportions in the molten phase at a temperature of about 150°–350° C. under an inert atmosphere, e.g., nitrogen. An alternate to this process comprises reacting the ester anhydride with the tetraamine in a suitable solvent to produce the corresponding monoamide, which is then isolated from solution and polymerized by itself in the molten phase at a temperature of about 150°–350° C. under an inert atmosphere.

The third procedure, which is particularly suitable when the tricarboxylic acid substance is not the ester anhydride, but is either the free acid or the acid anhydride. In this procedure the tricarboxylic acid or its anhydride and the tetraamine in equimolar amounts are dissolved in a suitable dehydrating solvent, e.g., polyphosphoric acid and reacted at 170°–250° C., preferably 200°–210° C. until the desired molecular weight is obtained. The reaction time may vary up to about 24 hours.

The tricarboxylic acid substance employed as a reactant in the process of this invention is normally a tricarboxylic acid in which two of the acid groups are normally, but not necessarily, attached to adjacent atoms in the ring, while the third acid group is attached to an atom which is not adjacent to those carrying either of the other two acid groups. Thus, the simplest and one of the most desirable of the tricarboxylic acids is trimellitic acid (1,2,4-benzenetricarboxylic acid). In the case of the naphthalene tricarboxylic acid, there are many more possibilities for positioning the three acid groups in preferred locations. When two of the acid groups form an anhydride ring they may be in the 1- and 2-positions with the third acid group in any of the 4-, 5-, 6-, or 7-positions. Alternatively, two of the acid groups may be in the 2-, and 3-positions while the third acid group may be in the 5-, 6-, 7-, or 8-position. Furthermore, in the case of naphthalene and other fused ring structures, there is still a third alternative in which the two acid groups which form the anhydride are in the 1-, and 8-positions while the other acid group is in the 3-, 4-, 5-, or 6-position. As may be readily appreciated, even a greater number of ring positions are available for the three acid groups in the anthracene series and other aromatic compounds having three or more fused rings.

In a similar fashion, heteroaromatic tricarboxylic acids may be employed as the tricarboxylic acid substance in the process of this invention. In the case of simple structures such as pyridine, pyran, thiophene, furan, pyrrole, and the like there are relatively few possibilities for positioning the three acid groups. For example, in the case of pyridine two of the acid groups may be in the 2- and 3-positions while the third acid group may be in the 5- or 6-position; or alternatively, two acid groups may be in the 3- and 4-positions while the third acid group is in the 6-position. Among the larger and more complex heteroaromatic structures which form the nucleus for tricarboxylic acids positioned as described above are: quinoline; quinoxaline; acridine; phenazine; phenthiazine; benzimidazole; benzothiazole; benzoxazole; benzopyrrole; benzothiophene; benzofuran; and carbazole. Still other heteroaromatic tricarboxylic acids will be apparent to those skilled in the art of this chemistry.

The tetraamine reactant which is employed in the process of this invention has an aromatic or heteroaromatic nucleus to which are attached two pairs of amino groups. The amines within each pair are positioned ortho with respect to each other, and the two pairs are separated from each other by at least one cyclic nucleus atom of the aromatic ring. The nucleus to which the four amine groups are attached may be benzene, naphthalene, anthracene, biphenyl, diphenyl ether, diphenyl sulfide, diphenyl sulphone as well as certain of the heteroaromatic structures such as: pyridine; thiophene; pyrrole; furan; quinoline; quinoxaline; acridine; phenazine; phenthiazine; carbazole; benzothiophene; benzopyrrole; benzofuran; and the like. The more simple and symmetrical compounds are preferred such as:

3,3′,4,4′-tetraaminodiphenyl ether;
3,3′,4,4′-tetraaminodiphenyl sulfide;
3,3′,4,4′-tetraaminodiphenyl sulfone;
1,2,4,5-tetraaminobenzene;
1,4,5,8-tetraaminonaphthalene;
2,3,6,7-tetraaminonaphthalene;

and the like.

The polymerization products of this invention have recurring units along the polymer chain of the following general formula:

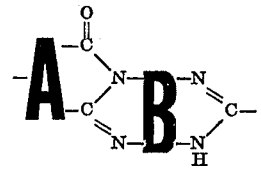

wherein A and B are aromatic or heteroaromatic cyclic structures. A is derived from the ester anhydride reactant and B is derived from the tetraamine reactant. One of the preferred polymers is made when A is chosen as the residue of trimellitic anhydride and B is the residue of 3,3′-diaminobenzidine, which produces the polymer having recurring units of the following formula:

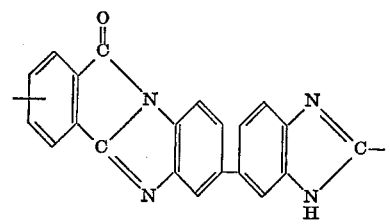

which may be described as a polymer having alternating segments of 1,2-benzoylbenzimidazole and benzimidazole. It is readily understood from the foregoing formula that if other materials are chosen for the anhydride moiety or other materials are chosen for the tetraamino moiety, corresponding polymeric structures will result.

In the process of this invention, there are three alternative procedures which may be employed to prepare the polymer. One procedure involves reacting the ester of a tricarboxylic acid anhydride with a tetraamine in a single step to produce the resulting polymer. A second procedure employs these same three reactants, but produces a monoamide as an intermediate product, which, in turn, is reacted with itself to produce the final polymer. A third procedure involves reacting a tricarboxylic acid or its anhydride with a tetraamine in a dehydrating solvent to produce the polymer directly.

If phenyl trimellitate anhydride were reacted with 3,3′-diaminobenzidine according to the first procedure, or if trimellitic acid or trimellitic acid anhydride were reacted with 3,3′-diaminobenzidine according to the third procedure, a polymer of the above formula would result.

On the other hand if phenyl trimellitate anhydride and 3,3'-diaminobenzidine were reacted according to the second procedure, a monoamide is produced which is polymerized in the molten phase to the final polymer product. The monoamide which would be produced has the following formula:

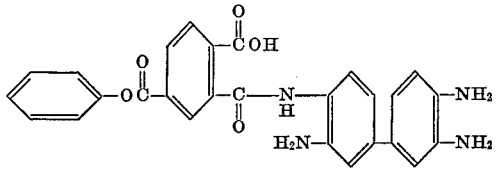

When this monoamide is reacted with itself in the molten phase a polymer is produced having the same formula as described above with respect to the other procedures.

This invention may be more fully understood by reference to the following operative examples. Parts and percentages are by weight and temperatures are in degrees centigrade unless otherwise specified. It is to be understood that these examples are illustrative of certain embodiments of this invention and are not intended to be construed as limiting the scope of the invention in any manner whatsoever.

EXAMPLE 1

In this example, a polymer is prepared which has alternating units of 1,2-benzoylbenzimidazole and benzimidazole. The ester anhydride reactant was synthesized by reacting 105 g. of the monoacid chloride of trimellitic anhydride and 94 g. of phenol under a nitrogen atmosphere in 200 g. of refluxing toluene for 16 hours. Copious amounts of hydrogen chloride gas evolved and were absorbed in a suitable gas trap. Evaporation of the toluene solvent in vacuo (water aspirator) at 80° C. produced a viscous, pasty yellow, solid material which was then distilled in vacuo (ca. 15 in. Hg) to produce 46 g. of phenol (theoretical yield 47 g.), exhibiting a boiling point of 120°–140° C.; and 140 g. of crude 4-phenyl trimellitate anhydride (theoretical yield 184 g.) exhibiting a boiling point of 260°–270° C. The crude ester had a melting point of 143°–147° C., was readily soluble in most organic solvents and could be recrystallized from chloroform, benzene-Skelly B mixture, or methylene chloride-Skelly B mixture. A small portion of white crystals suitable for elemental analysis was recrystallized from chloroform and dried in vacuo (0.1 mm. Hg) for 2 hours at room temperature. The recrystallized product had a melting point of 149°–150° C. and a neutralization equivalent of 268 (theory, 272). Elemental analysis for $C_{15}H_8O_5$: Calculated: C, 67.17; H, 2.98. Found: C, 67.09; H, 3.00.

The infrared spectrum of the product had absorption bands indicative solely of cyclic anhydride and phenyl ester functionalities. The product was phenyl trimellitate anhydride having the formula:

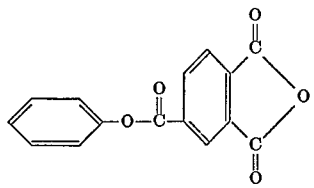

Under a nitrogen atmosphere, equimolar amounts of phenyl trimellitate anhydride (2.68 g.) and 3,3'-diaminobenzidine (2.14 g.) were heated in the molten phase from 100°–300° C. (ca. 1°/min. temperature rise) for 2 hours. At first the reactants melted and water was detected in the effluent gas (ca. 150°–160° C.). At about 230° C. the mass was still semi-molten and copious amounts of phenol were detected in the effluent gas. A short time later, at about 270° C., the mass solidified. After cooling to room temperature, the dark brown mass or plug was ground to a fine powder in an agate mortar and reheated in vacuo (0.5 mm. Hg) at 300°–350° C. for 1 hour to produce a polymeric material which was soluble in conc. sulfuric acid. Comparison of the infrared spectrum of the polymer with the infrared spectra of the model compounds, 1,3-benzoylbenzimidazole and 2-phenylbenzimidazole, was further proof that the polymer had 1,2-benzoylbenzimidazole and benzimidazole units alternately recurring along the polymer chain in accordance with the formula:

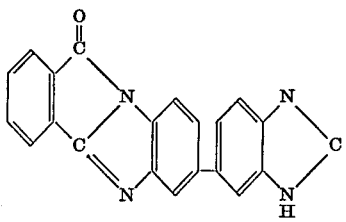

Differential thermal analysis and thermogravimetric analysis studies demonstrated that the polymer was stable in nitrogen to approximately 700° C. (10% wt. loss) and in air to 600° C. (10% wt. loss).

EXAMPLE 2

In this example, the same polymer as that described in Example 1 was prepared employing the same reactants but using the two-step process in which a monoamide is prepared as an intermediate product in the first step of the process.

Under a nitrogen atmosphere, 1.07 g. of 3,3'-diaminobenzidine was dissolved in 50 cc. of AR grade acetone. At room temperature, with stirring, 1.34 g. of phenyl trimellitate anhydride was added slowly to the acetone solution. A yellow solid in quantitative yield was collected by suction filtration, washed on the filter several times with acetone, and dried in vacuo (0.2 mm. Hg) for 4 hours. The product had a melting point of 159°–161° C. and an elemental analysis for $C_{27}H_{22}N_4O_5$ of: Calculated: C, 67.22; H, 4.56; N, 11.61. Found: C, 69.63; H, 4.94; N, 8.37.

The infrared spectrum of the product had absorption bands indicative of amine, amide, acid, and ester functionalities and thus additionally supported the conclusion that the product had the following structure:

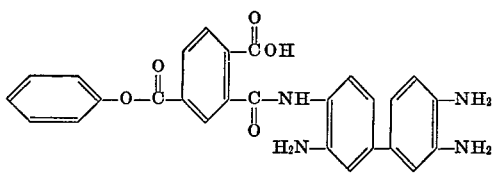

The above monoamide in the amount of 2 g., was heated slowly under nitrogen to 170° C. At 160° C. the monoamide started to melt and foam slightly, and water was detected in the effluent gas. After about 30 min. the molten mass solidified. The solid was heated slowly to 250° C. At about 230° C. the solid became semi-molten, and large amounts of phenol were detected in the effluent gas. After about 30 min. the mass solidified again. The temperature of the solid was raised slowly to 300° C. and held at 300° C. for an additional 30 minutes. After cooling to room temperature the solid plug was ground to a fine powder in an agate mortar and reheated in vacuo to 300°–350° C. for 1 hour. The polymeric product was soluble in conc. sulfuric acid and had an infrared absorption spectrum practically identical to that reported for the polymer of Example 1.

Differential thermal analysis and thermogravimetric analysis demonstrated that the polymer exhibited a thermal stability substantially the same as that of the polymer of Example 1.

Elemental analysis for $C_{21}H_{10}N_4O$ indicated: Calculated: C, 75.45; H, 3.00; N, 16.76. Found: C, 72.69; H, 3.68; N, 10.81.

EXAMPLE 3

A 250-ml. flask was charged with 125 g. of polyphosphoric acid (116%) and 3.59 g. (0.01 mol) of 3,3'-diaminobenzidine tetrahydrochloride. The contents of the flask were heated at 140° C. under a thin stream of nitrogen until all the bubbles of hydrogen chloride gas were eliminated. To this solution was added 1.92 g. (0.01 mol) of trimellitic anhydride and the heating was continued at 200°–210° C. for 12 hours. The solution became quite dark and viscous as the polymerization continued. The polymer was isolated by pouring the hot solution into water, filtering, washing in turn with water, a dilute sodium bicarbonate solution, water, and ethanol, and finally drying. The polymer was a dark brown resinous mass (3.1 g.) and was soluble in concentrated sulfuric acid, and had the same structure as that shown in Example 1.

Differential thermal analysis and thermogravimetric analysis indicated that the polymer had a thermal stability substantially the same as that of the polymers prepared in the previous examples. Further, the infrared absorption spectrum was substantially the same as the spectra of the polymers in Examples 1 and 2.

When trimellitic acid is used in place of trimellitic anhydride in this process, the same polymer is produced.

Although the invention has been described in considerable detail with reference to certain preferred embodiments thereof, it will be understood that variations and modifications can be effected within the spirit and scope of the invention as described hereinabove and as defined in the appended claims.

What is claimed is:

1. A film-forming polymer consisting essentially of recurring units having the formula

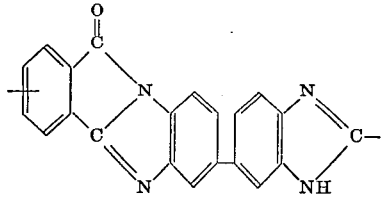

References Cited

UNITED STATES PATENTS

| | | | |
|---|---|---|---|
| 3,387,058 | 6/1968 | Levine | 260—78 T F |
| 3,414,543 | 12/1968 | Paufler | 260—78 T F |
| 3,435,004 | 3/1969 | Hathaway et al. | 260—78 T F |
| 3,444,136 | 5/1969 | Belohlav et al. | 260—78 T F |

HAROLD D. ANDERSON, Primary Examiner

U.S. Cl. X.R.

260—30.8 R, 47 CZ, 346.7, 471 R